United States Patent [19]

Deaver et al.

[11] Patent Number: 4,973,099
[45] Date of Patent: Nov. 27, 1990

[54] BRIDGE CONSTRUCTION FOR A PICKUP TRUCK

[76] Inventors: Dann T. Deaver, 33030 Jefferson St., Clair Shores, Mich. 48082; Aris G. Nichols, 923 University, Grosse Pointe, Mich. 48230

[21] Appl. No.: 338,860

[22] Filed: Apr. 17, 1989

Related U.S. Application Data

[63] Continuation-in-part of Ser. No. 153,654, Feb. 8, 1988.

[51] Int. Cl.⁵ ............................................. B62D 25/06
[52] U.S. Cl. ...................................... 296/99.1; 296/26
[58] Field of Search ................. 296/10, 26, 97.1, 102; D12/156

[56] References Cited

U.S. PATENT DOCUMENTS

| | | | |
|---|---|---|---|
| 4,688,845 | 8/1987 | Kingsley | 296/99.1 |
| 4,799,726 | 1/1989 | Scott | 296/10 X |
| 4,828,315 | 5/1989 | Muirhead | 296/102 X |

Primary Examiner—Dennis H. Pedder
Attorney, Agent, or Firm—Harness, Dickey & Pierce

[57] ABSTRACT

A bridge for use for supporting overhead spotlights or for use as a sport bar for a pickup truck and located at the rear of the cab and adapted to be mounted on the side walls of the cargo box, the bridge having a pair of end caps being mirror images of each other and a center span located between the end caps, the end caps being of a generally common construction to facilitate adaptation of the bridge construction to a variety of makes and models of pickup trucks with a minimum amount of modification and including a socket connection for connecting the mating ends of the center span and end caps.

23 Claims, 3 Drawing Sheets

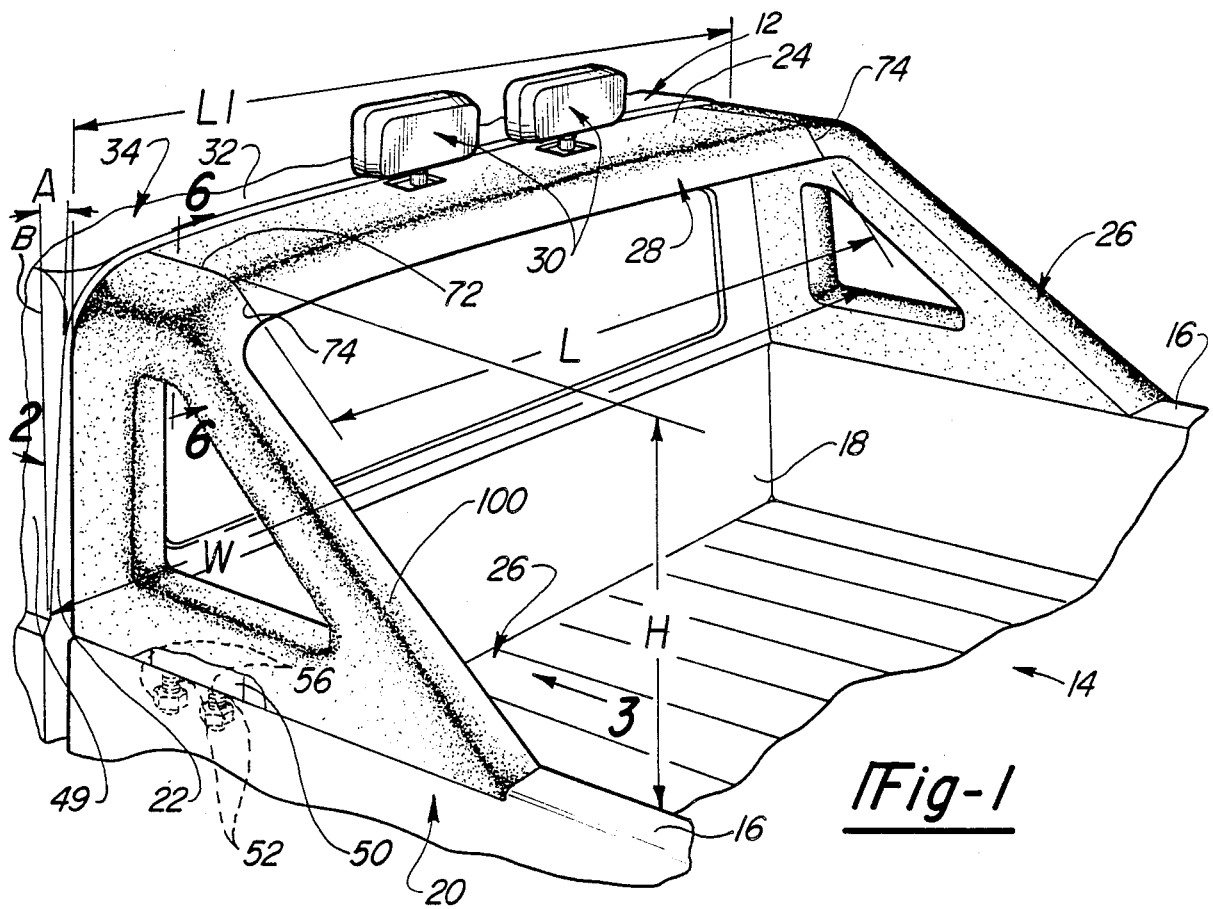
*Fig-1*
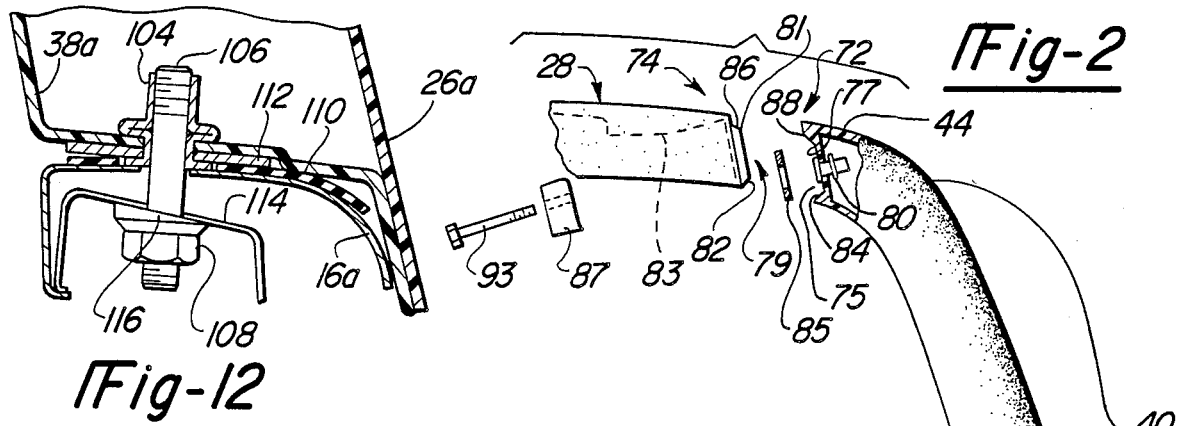
*Fig-12*       *Fig-2*
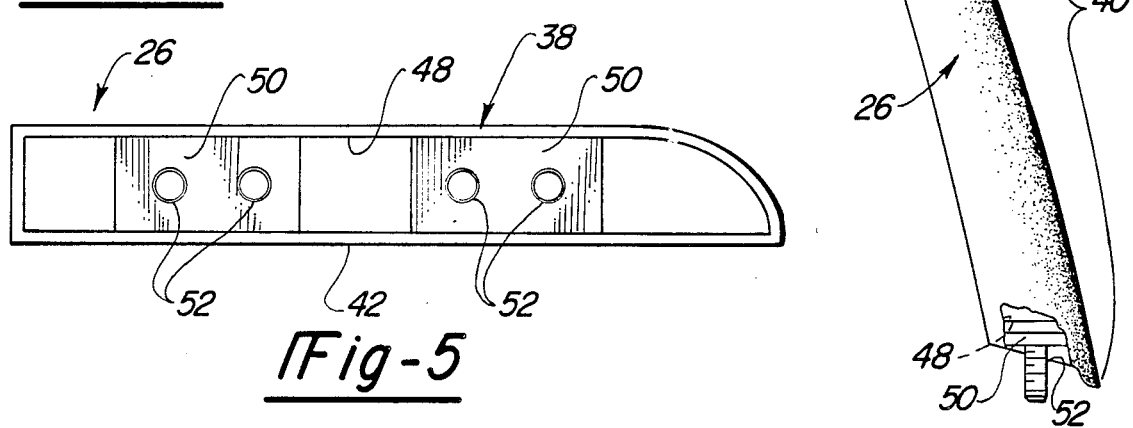
*Fig-5*

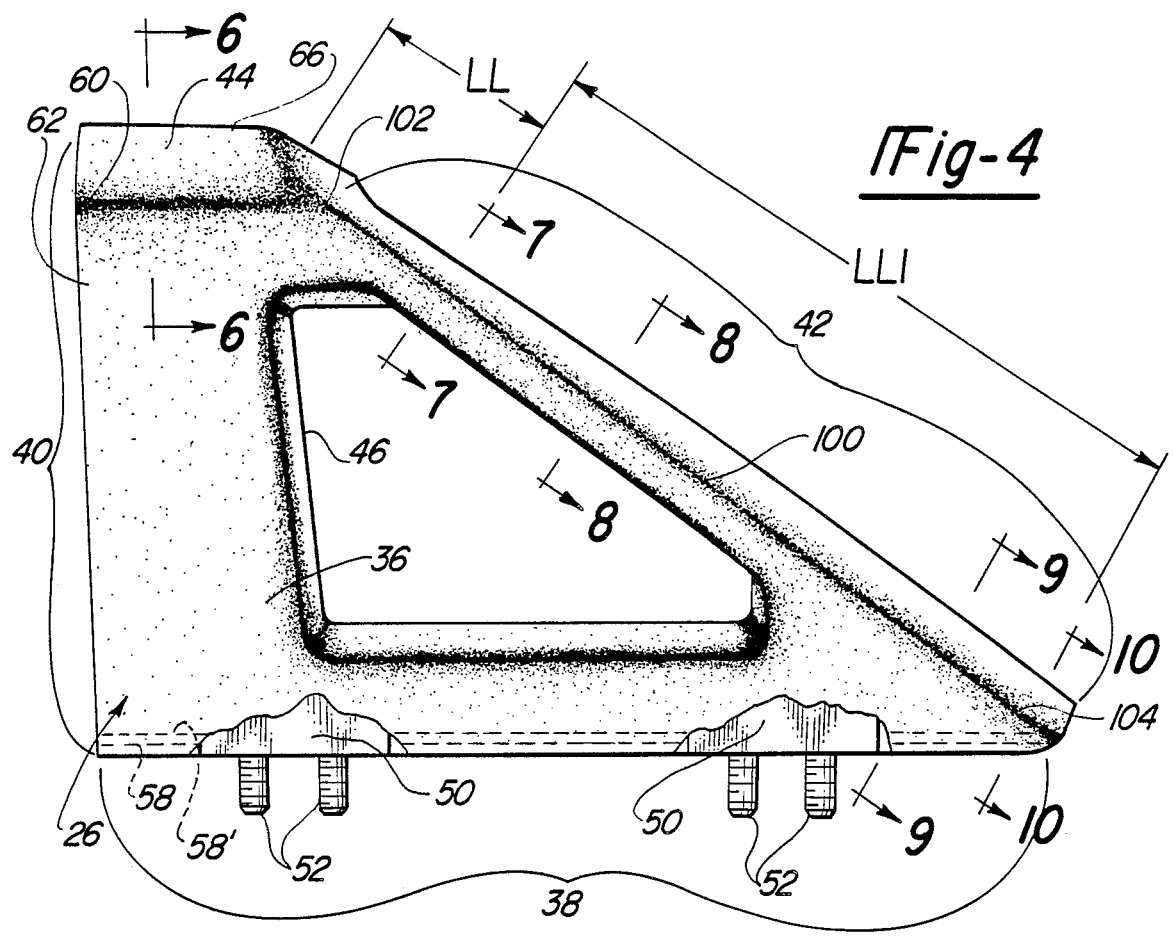
Fig-4
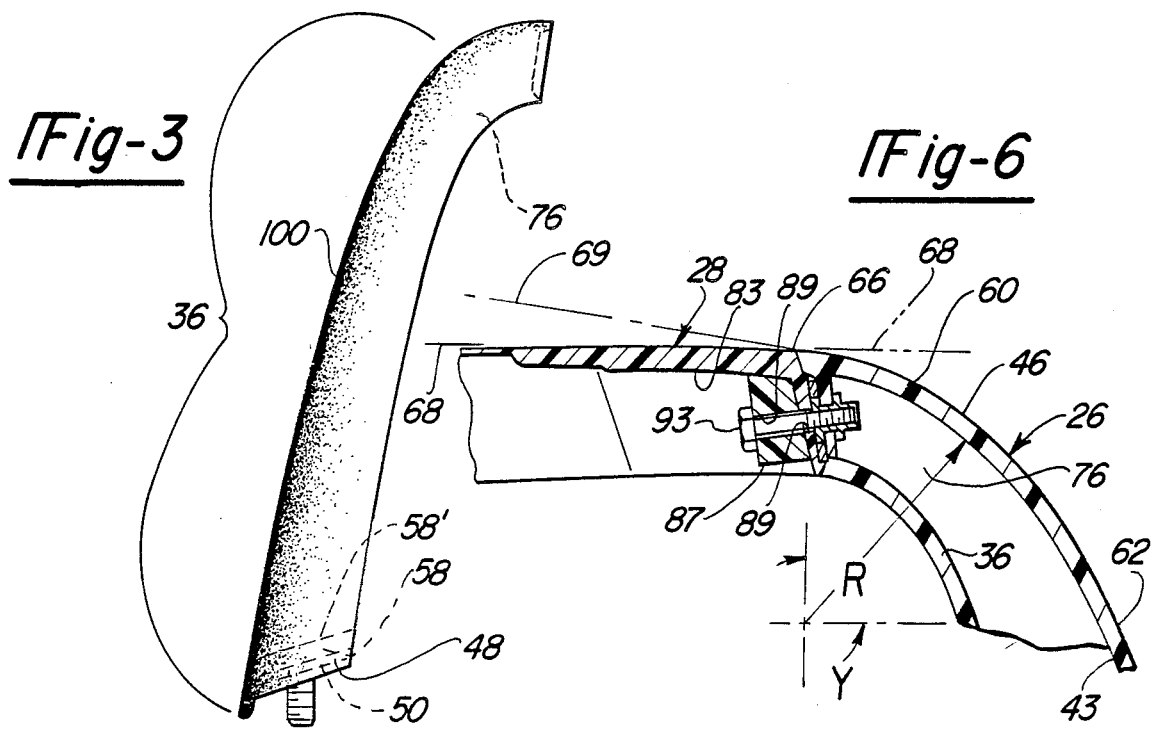
Fig-3
Fig-6

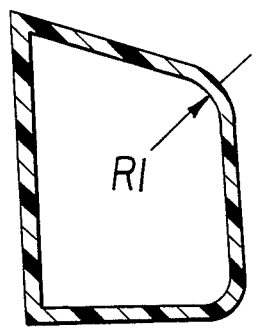
Fig-7
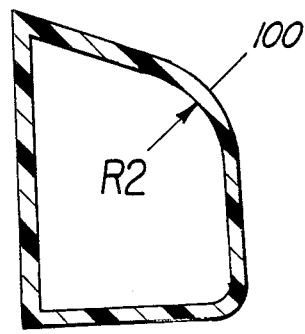
Fig-8
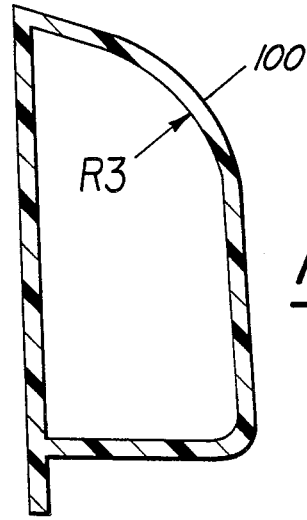
Fig-9
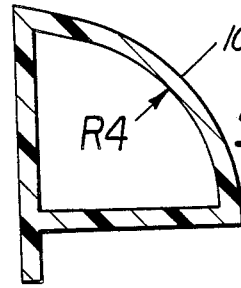
Fig-10
Fig-11
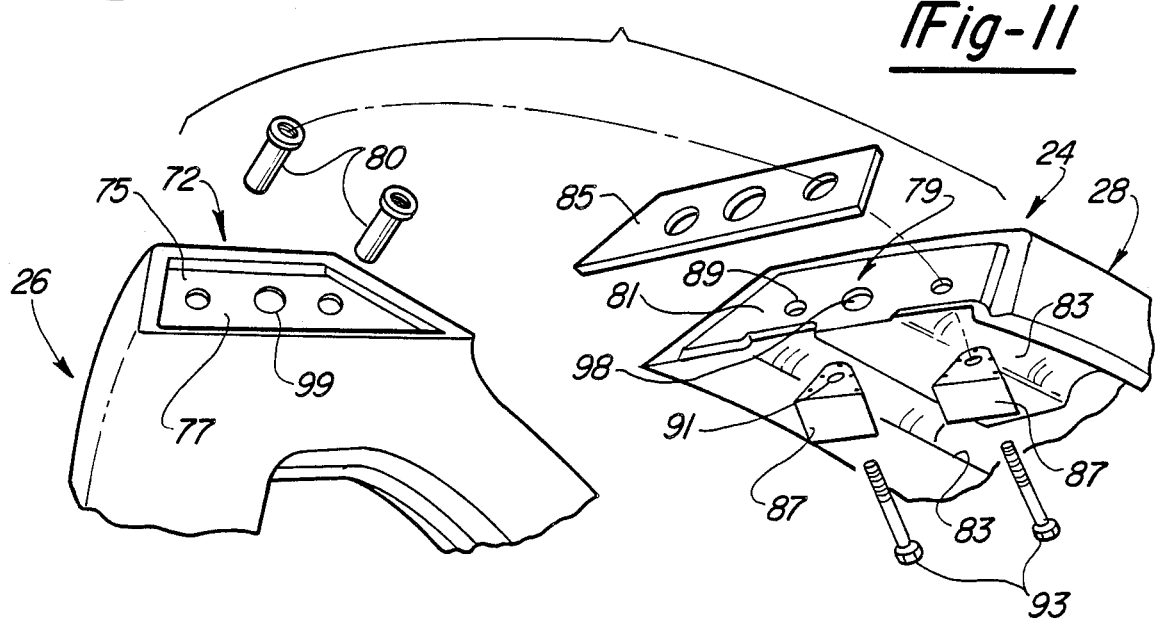

4,973,099

BRIDGE CONSTRUCTION FOR A PICKUP TRUCK

RELATED APPLICATIONS

The present invention is a continuation in part of U.S. patent application Ser. No. 153,654 filed Feb. 8, 1988 for Lightbridge and End Cap Thereof for a Pickup Truck.

SUMMARY AND BACKGROUND OF THE INVENTION

The present invention relates to a bridge construction for use as a lightbridge or sport bar for pickup trucks and more particularly to a bridge construction which is readily adaptable to a variety of makes and models of pickup trucks.

A lightbridge for a pickup truck supports overhead spotlights and is located at the back of the cab and is generally mounted on the side walls of the cargo box. The width of the cargo box can vary from one make or model pickup truck to the next; similarly the width of the cab and height of the cab roof above the cargo box side walls can vary. These size variations essentially have required the customized manufacture of lightbridges to accommodate the different pickup truck makes and models. With the present invention a lightbridge is provided having a pair of end caps with a center span member supported between the caps. The spotlights are mounted on the center span member. The right and left hand end caps utilize an integral, molded shell construction and are provided with a lower mounting base structure whereby the height of the end caps and hence of the center span can be readily adjusted to properly locate the spotlights for different makes and models. Thus a generally common molded end cap is provided which can be used "as is" for some makes and models or selectively varied at the base to accommodate other makes and models. The result is a savings in tooling and inventory. In this regard, the center span member is varied in length to provide the required variations in width of the lightbridge assembly. Also a unique contour of the end caps is provided to permit variations in the cant angle of the end caps to provide a good match with the contour of the cab whereby a pleasing appearance can be maintained while still being of a construction which can be adapted to accommodate different pickup truck makes and models.

The basic construction can be used on vehicles without lights as a decorative sport bar. In either event, i.e. with or without lights, the bridge acts as a cab extender. Thus with its location proximate to the back of the cab the aerodynamics are substantially improved at the rear wall of the cab helping to maintain the rear window clean and also facilitating use of the rear window when it is of a type that can be opened.

In addition a unique socket type connection is utilized to fasten the center span member to the end caps.

Therefore it is an object of the present invention to provide a bridge construction for pickup trucks having right and left hand end caps and a center span in which the end caps are adaptable for use on pickup trucks having different sized cabs and cargo boxes.

It is another object of the present invention to provide a bridge construction for pickup trucks having right and left hand end caps which can be assembled with center spans of different lengths and with the end caps being adapted to be canted at different angles for different assemblies while still providing a pleasing appearance when installed.

It is an object of the present invention to provide a bridge construction having a unique socket type connection for securing the center span member to the end caps.

It is a general object to provide a new and improved bridge construction for pickup trucks.

Other objects, features, and advantages of the present invention will become apparent from the subsequent description and the appended claims, taken in conjunction with the accompanying drawings, in which:

BRIEF DESCRIPTION OF THE DRAWINGS

FIG. 1 is a pictorial view of a bridge construction of the present invention as mounted on a pickup truck in the form of a lightbridge, with the pickup truck only partially shown, and with the bridge comprising a center span member and right and left hand end caps having mirror image identity;

FIG. 2 is exploded view with some portions broken away including an an end view of the left hand end cap of FIG. 1 taken generally in the direction of the Arrow 2 in FIG. 1 and the mating end of the center span and associated mounting parts;

FIG. 3 is a front view of the left hand end cap of FIG. 1 taken generally in the direction of the Arrow 3 in FIG. 1;

FIG. 4 is a side elevational view of the left hand end cap of FIG. 1;

FIG. 5 is a bottom elevational view of the left hand end cap of FIG. 1;

FIG. 6 is a fragmentary, sectional view of left hand end cap and center span member taken generally along the lines 6—6 in FIG. 4;

FIG. 7 is a sectional view of left hand end cap taken generally along the lines 7—7 in FIG. 4 with the outer corner having a radius R1;

FIG. 8 is a sectional view of left hand end cap taken generally along the lines 8—8 in FIG. 4 with the outer corner having a radius R2;

FIG. 9 is a sectional view of left hand end cap taken generally along the lines 9—9 in FIG. 4 with the outer corner having a radius R3;

FIG. 10 is a sectional view of left hand end cap taken generally along the lines 10—10 in FIG. 4 with the outer corner having a radius R4;

FIG. 11 is an exploded fragmentary pictorial view depicting the mating ends of the left hand end cap and center span and associated mounting structure; and FIG. 12 is a fragmentary, sectional view of a modified form of mounting structure between the base of the end caps and the side rail of the vehicle.

DETAILED DESCRIPTION OF THE PREFERRED EMBODIMENT

Looking now to FIG. 1, a pickup truck 10 is partially shown and has a cab 12 and a cargo box 14; the cargo box 14 is defined by longitudinal side walls 16, a forward side wall 18 and rear side wall (not shown) which can include a hinged tailgate. A bridge assembly 20 is located behind the cab 12 at its rearward end 22 and is supported upon the forward portion of side walls 16.

The bridge assembly 20 includes right and left hand end caps 26 which are mirror images of each other and which are connected by a center span member 28. The bridge assembly 20 is shown as a lightbridge and hence spotlights 30 are mounted on the center span member 28 and can be connected to the electrical system of the pickup truck 10 by means known to those skilled in the art. Since these details do not comprise a part of the present invention they have been omitted for purposes of simplicity.

The center span member 28 is generally rectangularly shaped overall with a generally rectangular transverse cross section. The length L of the center span member 28 is selected to provide an overall length L1 to the bridge assembly 20 which will be approximately the same as the width W of the cab 12 at its rearward end 22. The bridge assembly 20 when secured to the pickup truck 10 is selected to have a height H to locate the upper surface 24 of the center span member 28 at approximately the level of the upper surface 32 of the roof 34 of the cab 12 whereby the spotlights 30 are readily positioned above the upper roof surface 32. This also provides for a pleasing appearance without unduly detracting from the load carrying capability of the cargo box 14.

Each end cap 26 has a one piece outer body 36 having a shape generally of a right triangle. Looking now to FIGS. 1 and 4, the outer body 36 has an elongated base portion 38 adapted to sit on the top of the associated one of the longitudinal side walls 16. The outer body 36 has a generally upright short leg portion 40 and also has an elongated hypotenuse leg portion 42. A connecting end or top portion 44 is located at the top or apex of the body 36 and curves generally transversely inwardly from the juncture of the short leg portion 40 and hypotenuse leg portion 42. The end cap 26 is provided with a generally triangularly shaped opening 46 which has a shape similar to the overall triangular shape of the outer body 36 itself. The one piece outer body 36 can be integrally formed by blow molding from a suitable plastic material such as Noryl 1265.

Frequently the sides 49 at the rearward end 22 of the cab 12 cant inwardly at a slight angle A relative to a vertical line B. In order to provide the bridge assembly 20 with a similar contour, the end caps 26 as assembled to the center span member 28 are similarly canted towards each other. Likewise, the side walls 16 may extend laterally slightly outboard from both sides of the cab 12., here the end caps 26 again can be canted inwardly to bring the apex or top portion 44 in line with the outer end of the cab 12 near its roof 34. But the bridge assembly 20 can be constructed to accommodate other variations in size and shape of associated pickup trucks.

Thus with different makes and models of pickup truck 10 the shape and general size of the bridge assembly 20 must be varied to accommodate the shape and general size of the associated portions of the cab 12 and cargo box 14. This can be accomplished by varying the overall length L1, and the height H of the bridge assembly 20 while at the same time varying the angle A of the inclination of the end caps 26 toward each other. With the present invention this can be done for a variety of makes and models of pickup trucks with a minimum of customization required.

In this regard the main or outer body 36 of the end cap 26 is generally hollow and has a hollow opening 48 at its base portion 38; mounting plugs 50 are located in the hollow opening 48 and have threaded studs 52 extending downwardly In mounting the bridge assembly 20 to the pickup truck 10, the threaded studs 52 are extended through complementary openings (not shown) in the hollow side walls 16 and are engaged by nut members 56 to fix the bridge assembly 20 to the side walls 16. As molded, the end caps 26 are formed to provide the maximum height H required for the series of makes and models of pickup trucks for which the bridge assembly 20 is to be used. For makes and models in that series requiring a lesser height H the base portion 38 of the outer body 36 of end cap 26 can be trimmed as along trim lines 58, 58' to provide the desired height H' and the desired cant angle A. Only two trim lines are shown by way of example. Thus in a first step in manufacturing the bridge assembly 20, a common outer body 42 is formed to substantially accommodate one model or make of pickup truck and by a second step can be modified at its base portion 38 to accommodate various other models or makes of pickup trucks.

Note that the upper surface 60 of end portion 38 is provided with a radius R which extends tangentially to the outer surface 62 of the generally straight, upper portion 44 The radius R, however, extends from the straight outer surface 62 for a limited arc Y. The arc Y is selected such that, over the range of cant angles A for the different makes and models, the terminating edge 66 will not be past or below the tangent point of the arc of the upper surface 60 with a horizontal plane 68. Preferably the edge 66 will be at least slightly above the point of tangency with the horizontal plane 68 over the range of angles of cant angle A. Another way of considering it is that the termination of the arcuate upper surface 60, i.e. at the edge 66, will be tangent with a straight line 69 extending upwardly in the direction of the center span 28. In this way there will never be an inwardly extending dip or discontinuity between upper surface 60 of the end portion 38 of end caps 26 and the upper surface 24 of the center span 28. The result will be a smooth, generally continuous surface contour between the end caps 26 and span 28.

The center span 28 is preferably provided with a slight curvature, (i.e. very large radius) over its length L and terminates at its outer ends in end portions 74. The end portion 72 of the end cap 26 is adapted to matingly engage an end portion 74 of the span 28. As noted the end caps 26 can be of a uniform construction for bridges for different makes and models of pickup trucks. Modifications are made to the outer body 42 generally solely on trim lines, such as trim lines 58, 58' to accommodate variations in height H and cant angle A. Note in this regard that trim line 58' will accommodate a different cant angle than the original line of base portion 36 and the line of trim line 58. Thus modification to the end portions 72 of the outer body 42 of end caps 26 will not be required. However, length L of the span 28 will be varied to provide the desired overall length L1 to the bridge 20. In doing so, the span end portions 74 are formed at the appropriate angle to provide a good match with the end cap portions 72.

The end caps 26 and span 28 are preferably connected together via a socket type connection between the end caps 26 and associated ends of the center span 28 (see FIGS. 2, 6 and 11). Thus the end portion 72 of end cap 26 is provided with an elongated recess or cavity 75 having a contour generally following that of the outer cross section of the periphery of end portion 72. A pair of flanged expansion nut members 80 are secured to the end surface 77 of cavity 75 with the nut flange bearing against that surface 77. Each of the mating ends 74 of center span 28 is provided with a plug portion 79 having a contour similar to that of the associated cavity 75 and is adapted to be generally matingly received within that cavity 75. The plug portion 79 itself has a generally planar end wall 81. A pair of laterally spaced access recesses 83 are generally closed at their outer ends only by the end wall 81. In assembly a flat spacer 85 is provided with a shape similar to the cavity 75 and is generally of the thickness of the protruding washer portion of expansion nut members 80. In addition the bottom end surface 82 of plug portion 79 and bottom end surface 84 of cavity 75 are similarly inclined to matingly engage; likewise the stepped upper surface 86 of plug portion 79 and similarly stepped upper surface 88 of cavity 75 are partially inclined and shaped to matingly engage. In assembly the bottom end surfaces 82 and 84 and stepped surfaces 86 and 88 are designed to provide a slight frictional fit as the plug surface 79 is pulled into engagement with the cavity surface 77 via the spacer 85. Thus, when the plug portion 79 is inserted into the associated cavity 75 and assembled, the loads will be spread over the mating surfaces of the plug portion 78 and cavity 75 to provide good load distribution.

In order to inhibit local stresses on the end wall 81, a pair of support plugs 87 are provided to be matingly located in the front end of recesses 83; the support plugs 87 have through bores 91 adapted to be aligned with enlarged openings 89 in the end wall 81. The support plugs 87 are contoured to matingly fit within the associated recess 83 such as to provide good load distribution. A pair of threaded bolts 93 extend through the support plugs 87 and the enlarged openings 89 in the end wall 81 and threadably engage the flanged nut members 80. As the bolts 91 are threaded into the nut members 80 the blind end will collapse to provide a blind head to secure the nut members 80 to the cavity end wall. Alternatively the blind head can be preformed by a suitable setting tool. Thus the combination of the mating engagement of the plug portions 79 with cavities 77 and the support plugs 85 with the recesses 83 and end wall 81 not only provide good load bearing and load distribution for clamp up and bending of the final assembly but also inhibit localized stresses at the connection between the end caps 26 and center span member 28. An access hole 98 through the plug portion 79 is adapted to be aligned with an access hole 99 through the cavity 75 and can be used for wiring purposes.

In order to provide the bridge 20 with a pleasing appearance for different makes and models the outer edge or corner 100 is provided with a varying radius of curvature from a point 102 near its upper end to a point 104 near its base 36 (FIG. 4). This variation in curvature can be seen in FIGS. 7-10, where the radii R1, R2, R3 and R4 become progressively larger.

Thus one of the features of the design is the provision of a smooth transition in curvature of the outer corner 100 of the end caps 26 from a sharp curvature at the upper end 102 of the corner 100 to a substantially broader curvature at the lower end approximately at radius R4; this is depicted by radii R1, R2, R3 and R4 of increasing radius from the upper end 102 to the lower end 104.

In one form of the present invention the radius of the edge 100 increased from a radius R at the upper end 102 near the top of the edge 100 to radius R1 approximately at a rate of 15.5 millimeters per 100 millimeters of length LL and from radius R1 to radius R4 approximately at a rate of 2.75 millimeters per 100 millimeters of length LL1; in such one form the radius R at the upper end 102 was approximately 13/16 of an inch; the radius R1 was approximately 1-9/16 inches, and the radius R4 was approximately 2¼ inches. In the latter instance the length LL was approximately 5 inches and the length LL1 was approximately 25 inches.

Thus a structure is provided having a construction whereby the end caps 26 can be used for a variety of makes and models. At the same time the socket connection provides for a secure combination between the end caps 26 and the center span 28.

It can be seen that the bridge assembly 20 is located in close proximity to the rear wall at the rearward end 22 of the cab 12. Also the contour of the bridge assembly 20 generally follows that of the cab 12. With this construction the bridge assembly 20 effectively extends the length of the cab 12 beyond its rearward end 22. This improves the aerodynamic characteristics at the rearward end 22 of the cab assisting in keeping the rear window clean and also facilitating use of the rear window when it is of a type that can be opened.

An alternate form of fastening of the base 38 to the side walls 16 is shown in FIG. 12 where components similar to like components in the embodiment of FIGS. 1–11 are given the same numerical designation with the addition of the letter postscript "a". Unless described otherwise such similarly numbered components function in the same manner and the description thereof will not be repeated.

Looking now to FIG. 12, the end cap 26a has a plurality of flanged expansion nut members 104 secured to the base 38a. The nut member 104 can be set to form an enlarged head on the blind side of the bore 38a via a bolt or stud 106 and nut 108. Alternatively the blind head can be preset by a suitable setting tool. The stud extends into the associated side wall 16a and the nut 108 is secured thereto from the underside of the side wall 16a. A sealing gasket 110 is located between the base 38a and upper engaging surface of the side wall 16a and can be made of an elastomeric rubber like material.

The side wall 16a can have a double wall construction including an inner wall 114 which may be angulated as shown. With such a structure a truncated washer 116 can be used to provide a generally matching surface with angulated inner wall 114.

A double sided adhesive strip 112 is used to secure the gasket 110 to the bottom surface of the base 38a. The adhesive strip 112 thus permits the sealing gasket 110 to be preassembled to the bottom surface of the base 38a. The sealing gasket 110 can assist to accommodate differences in contour between the upper engaging surface of the side wall 16a and also to lessen noise and vibration and inhibit wear and corrosion of the upper engaging surfaces of the side wall 16a.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:
1. A bridge for a pickup truck with the pickup truck having a cab and an open cargo box located at the rear of the cab and with the cargo box defined at least by longitudinally extending side walls and with the bridge adapted to be supported on a forward portion of the side walls immediately adjacent the rear of the cab,
said bridge comprising:
a pair of end caps being mirror images of each other,
a center span located between said end caps,
said end caps having a generally hollow outer body, said outer body having an upright portion and a top portion extending generally transversely to said upright portion, said top portion terminating in a top end portion, said center span terminating at opposite ends in opposite end portions, each of said opposite end portions adapted to matingly engage one of said top end portions, securing means for securing said center span and said end caps together at said opposite end portions and said top end portions, respectively, to define a substantially smooth outer surface across the juncture of said opposite end portions and said top end portions, said outer body having a base portion, said outer body having a preselected height whereby when said base portion is located on the side walls of the cargo box said center span is located substantially at the roof of the cab, said end caps being generally shaped as a right triangle and having a hypotenuse portion extending between said top portion and said base portion, said hypotenuse portion having an arcuately shaped outer edge with a radius of curvature increasing from a position proximate said top portion to a position proximate to said base portion.

2. The bridge of claim 1 with said top portion extending generally arcuately from said upright portion, said outer edge of said hypotenuse portion having a first radius of curvature increasing at a first rate from a location near said top portion to a location intermediate said top portion and said base portion and having a second radius of curvature which increases at a second rate from said intermediate location to said base portion.

3. The bridge of claim 2 with said first radius of curvature increasing at a rate greater than said second radius of curvature.

4. The bridge of claim 3 with said first radius of curvature varying at a rate of around 15.5 millimeters per 100 millimeters of length of said hypotenuse portion.

5. The bridge of claim 3 with said second radius of curvature varying at a rate of around 2.75 millimeters per 100 millimeters of length of said hypotenuse portion.

6. The bridge of claim 4 with said second radius of curvature varying at a rate of around 2.75 millimeters per 100 millimeters of length of said hypotenuse portion.

7. The bridge of claim 3 with said first radius of curvature varying from around 13/16 of an inch to around 1-9/16 inches.

8. The bridge of claim 3 with said second radius of curvature varying from around 1-9/16 inches to around 2¼ inches.

9. The bridge of claim 7 with said second radius of curvature varying from around 1-9/16 inches to around 2¼ inches.

10. The bridge of claim 1 adapted to support at least one overhead spotlight on said center span with said center span located substantially at the roof of the cab whereby the spotlight will be located above the roof of the cab.

11. A bridge for a pickup truck with the pickup truck having a cab and an open cargo box located at the rear of the cab and with the cargo box defined at least by longitudinally extending side walls and with the bridge adapted to be supported on a forward portion of the side walls immediately adjacent the rear of the cab, said bridge comprising:

a center span terminating at opposite ends in span end portions having span end surfaces, a pair of end caps adapted to be located on opposite sides of the center span, said end caps being mirror images of each other, each of said end caps having a generally hollow outer body, said outer body having an upright portion and a top portion extending generally transversely to said upright portion, said top portion terminating in a top end portion having a top end surface, said top end surface of said end caps adapted to matingly engage one of the opposite end surfaces of the center span, securing means for securing said end caps and the center span with said top end portion of each of said end caps and said span end portion surfaces of the center span cooperating to define a substantially smooth outer surface across the juncture of each said top end portion and said span end surfaces, said securing means comprising a socket joint including a cavity at one of said top end portion and said span end portion and a plug portion in the other of said top end portion and said span end portion, said plug portion and said cavity having mating surfaces at least partially similarly inclined to provide a slight interference fit between said mating surfaces as said end caps and center span are secured together, said cavity having an inner surface and said plug portion having an outer surface, said mating surfaces being located around the periphery of said inner and outer surfaces, said inner and outer surfaces being generally planar and adapted to be in substantial clamping engagement upon assembly when said mating surfaces are in frictional engagement through said interference fit.

12. The bridge of claim 11 with said span end portion having a pair of laterally spaced cavities extending laterally behind said span end surface, said securing means comprising fastener means including a nut member and a bolt member with said cavities adapted to receive said bolt member to provide access to one of said nut members and said bolt member to facilitate assembly.

13. The bridge of claim 12 further including plug members adapted to be matingly located within said cavities and behind said span end surfaces to receive said bolt member to facilitate load distribution away from said span end surface.

14. A bridge for a pickup truck with the pickup truck having a cab and an open cargo box located at the rear of the cab and with the cargo box defined at least by longitudinally extending side walls and with the bridge adapted to be supported on a forward portion of the side walls immediately adjacent the rear of the cab, said bridge comprising:

a center span terminating at opposite ends in span end portions having span end surfaces, a pair of end caps adapted to be located on opposite sides of the center span, said end caps being mirror images of each other, each of said end caps having a generally hollow outer body, said outer body having an upright portion and a top portion extending generally transversely to said upright portion, said top portion terminating in a top end portion having a top end surface, said top end surface of said end caps adapted to matingly engage one of the opposite end surfaces of the center span, securing means for securing said end caps and the center span with said top end portion of each of said end caps and said span end portion surfaces of the center span cooperating to define a substantially smooth outer surface across the juncture of each said top end portion and said span end surfaces, said securing means comprising a socket joint including a cavity at one of said top end portion and said span end portion and a plug portion in the other of said top end portion and said span end portion, said plug portion and said cavity having mating surfaces at least partially similarly inclined to provide a slight interference fit between said mating surfaces as said end caps and center span are secured together, said cavity being defined in said top end portion and said plug portion being defined in said span end portion.

15. The bridge of claim 14 with said cavity having an inner surface and said plug portion having an outer surface, said mating surfaces being located around the periphery of said inner and outer surfaces, said inner and outer surfaces being generally planar and adapted to be in substantial clamping engagement upon assembly when said mating surfaces are in frictional engagement through said interference fit.

16. The bridge of claim 15 with said span end portion having a pair of laterally spaced cavities extending laterally behind said span end surface, said securing means comprising fastener means including a nut member and a bolt member with said cavities adapted to receive said bolt member to provide access to one of said nut members and said bolt member to facilitate assembly.

17. The bridge of claim 16 further including plug members adapted to be matingly located within said cavities and behind said span end surfaces to receive said bolt member to facilitate load distribution away from said span end surface.

18. The bridge of claim 11 with the cargo box side walls having an upper surface and including mounting means for securing the bridge to the upper surface of the cargo box side walls, said outer body having a base portion connected with said upright portion, said securing means including a flanged expansion nut member connected to a bottom surface of said base portion, a bolt member adapted to extend through the upper surface of the side wall to engage said nut member, an elastomeric gasket member located between said bottom surface of said base portion and the upper surface of the cargo box and adapted to be clamped therebetween by said securing means.

19. The bridge of claim 18 further including a double sided adhesive strip for initially securing said elastomeric gasket to said bottom surface of said base portion.

20. The bridge of claim 17 with the cargo box side walls having an upper surface and including mounting means for securing the bridge to the upper surface of the cargo box side walls, said outer body having a base portion connected with said upright portion, said securing means including a flanged expansion nut member connected to a bottom surface of said base portion, a bolt member adapted to extend through the upper surface of the side wall to engage said nut member, an elastomeric gasket member located between said bottom surface of said base portion and the upper surface of the cargo box and adapted to be clamped therebetween by said securing means.

21. The bridge of claim 20 further including a double sided adhesive strip for initially securing said elastomeric gasket to said bottom surface of said base portion.

22. The bridge of claim 18 with the side wall being of a double wall structure and having an inner wall angulated relative to the upper surface, said bolt member extending through said inner wall and a truncated washer member having an angled surface to generally match the angle between the inner wall and upper surface of the side wall.

23. The bridge of claim 11 adapted to support at least one overhead spotlight on said center span with said center span located substantially at the roof of the cab whereby the spotlight will be located above the roof of the cab. The

* * * * *